UNITED STATES PATENT OFFICE.

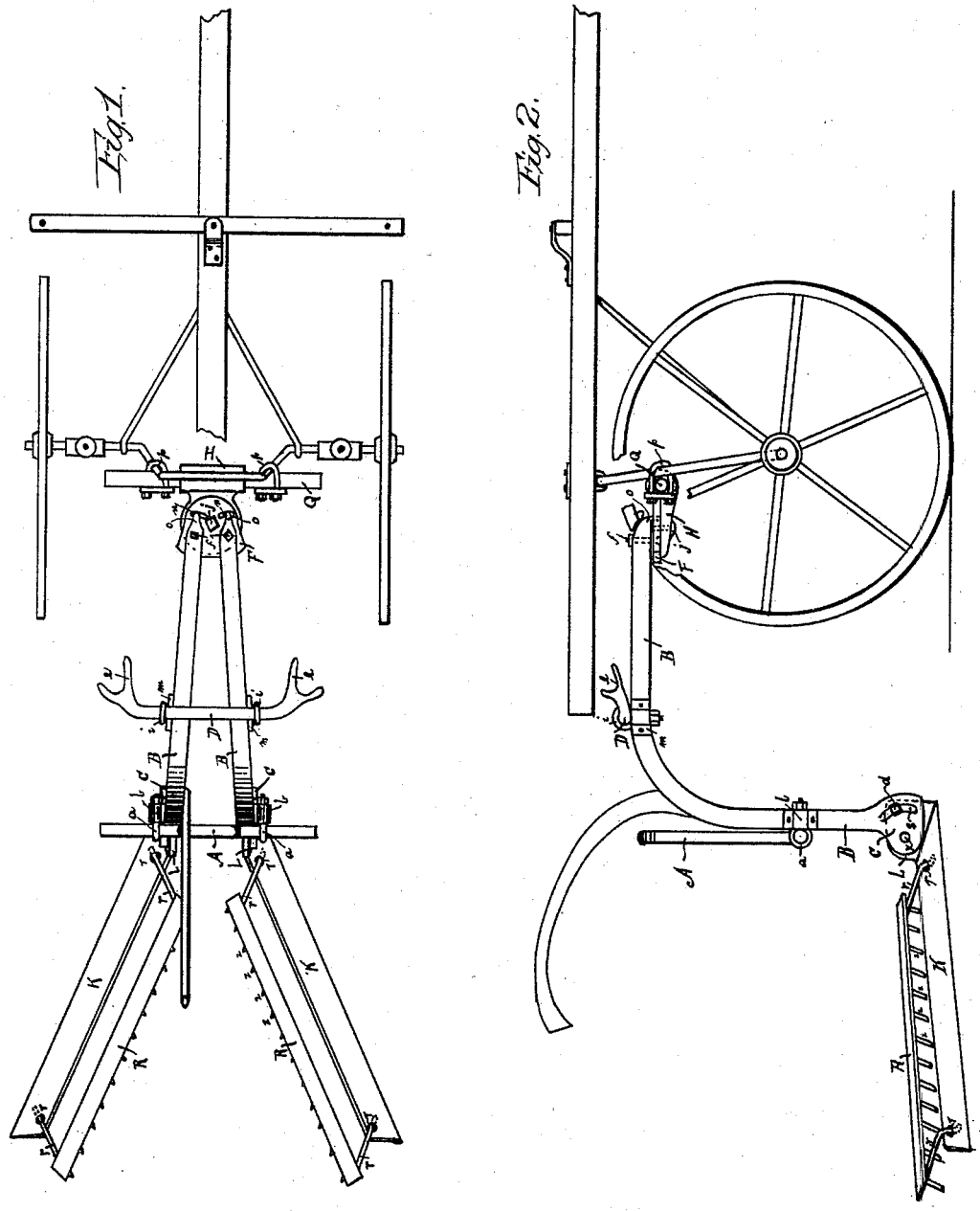

LAMBERT P. SCHRADER, OF CLAY CENTRE, KANSAS.

CULTIVATOR FOR LISTED CORN.

SPECIFICATION forming part of Letters Patent No. 431,079, dated July 1, 1890.

Application filed September 17, 1889. Serial No. 324,278. (No model.)

*To all whom it may concern:*

Be it known that I, LAMBERT P. SCHRADER, a citizen of the United States, residing at Clay Centre, in the county of Clay and State of Kansas, have invented certain new and useful Improvements in Cultivators for Listed Corn; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in cultivators for listed corn; and the objects are to provide a weed-cutter which may be readily attached to the ordinary cultivator-carriage and easily adjusted in its several parts to conform to the shape of the furrow, cut the weeds clean, and avoid the necessity of constant attention to keep the knives from cutting the corn at each slight deviation of the team from the track, at the same time tearing out the weeds and stirring the soil. I accomplish these objects by means of the mechanism hereinafter described, and illustrated in the accompanying drawings, in which—

Figure 1 is a plan of my cultivator attached to a carriage, and Fig. 2 a side elevation of same.

Similar letters refer to similar parts throughout both the views.

B B are the plow-beams adjustably connected by the arched brace or bridge A, the ends of said bridge being bent to pass through eyebolts $a\,a$, which for lightness of construction are secured to said beams through staples $b\,b$. The ends L of knives K, being turned at an angle with said knives, are connected with the feet C of said beams by pivot-bolts through holes $x$ and the bolts $d$ through the slots $s$, thus admitting of the adjustment of knives K to such planes as will cause them to shave the sides of the furrow without drawing in and increasing the draft. The cross-bar D, to stiffen the upper portion of the plow-beams, is secured to said beams by eyebolts $i\,i$, passing through staples $m\,m$. $e\,e$ are merely foot-rests for the operator when riding. A pivot-connection is formed between the carriage and beams by bolt $j$, passing through plates F and H, thus avoiding the danger of knives K being drawn into the corn by any slight deviation of the team from the track, for the reason that the position of the knives themselves—one on each side of the furrow—naturally tends to keep them in position. The forward end of plate H is a sleeve, through which passes the connecting-bar Q, which is secured to the carriage-axle by means of clevises $p\,p$. The forward ends of beams B are pivoted to plate F by bolts $f$, the points $o$ of the beams being turned and entering slots $n\,n$, thus admitting of the spreading or contracting of said beams at will by merely loosening eyebolts $a\,a$ and $i\,i$. Harrow attachments R, having teeth $z\,z$, are secured to knives K by arms $r\,r$, bent substantially as shown, and passing through holes T T, the objects of the attachments R being to tear out the cut weeds and stir the soil, and they may be attached to knives K in other ways; but the connection shown leaves them free from the danger of clogging or other obstruction, and does not allow them to drop under the knives when the latter are raised.

Having thus described my invention, what I claim as new, and desire to secure by Letters Patent, is—

1. In a cultivator, the beams B, having the perforated and slotted standard, in combination with the knives K, with the angular ears L, the pivot and adjusting-bolts, and the gravitating rake or harrow R and arms $r$, substantially as shown and described.

2. A cultivator in which the connection between the plow-beams and the draft-bar consists of plates F and H, pivoted together, thus allowing lateral play of the gangs, said plow-beams being pivoted to plate F to admit of their spreading, and said plate H having a sleeve-connection with the draft-bar Q to give vertical play to said beams, all substantially as shown and described.

3. In a cultivator, the combination of the connecting-bar Q, attachment H, to which is pivoted plate F, plow-beams B, cross-bar D, bridge or brace A, and knives K, adjustably connected with feet C of said plow-beams, substantially as shown and described.

In testimony whereof I affix my signature in presence of two witnesses.

LAMBERT P. SCHRADER.

Witnesses:
W. E. DAVIES,
T. SCOTT MORRISON.